(12) United States Patent
Sano

(10) Patent No.: US 10,415,669 B2
(45) Date of Patent: Sep. 17, 2019

(54) ROLLER CHAIN

(71) Applicant: TSUBAKIMOTO CHAIN CO., Osaka-shi, Osaka (JP)

(72) Inventor: Hirokazu Sano, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 250 days.

(21) Appl. No.: 15/643,722

(22) Filed: Jul. 7, 2017

(65) Prior Publication Data
US 2018/0017132 A1   Jan. 18, 2018

(30) Foreign Application Priority Data
Jul. 12, 2016   (JP) ................................. 2016-137454

(51) Int. Cl.
*F16G 13/06* (2006.01)

(52) U.S. Cl.
CPC .................................. *F16G 13/06* (2013.01)

(58) Field of Classification Search
CPC . F16G 13/06; B65G 17/38; F16H 7/06; Y10T 403/32926; B62D 53/025
USPC ........................................................ 474/231
See application file for complete search history.

(56) References Cited

U.S. PATENT DOCUMENTS

| | | | | |
|---|---|---|---|---|
| 536,863 A * | 4/1895 | Fanning | .................... | F16G 1/28 474/203 |
| 1,894,600 A * | 1/1933 | Schmidt | .................. | F16G 13/06 474/208 |
| 2,129,407 A * | 9/1938 | Dalrymple | .............. | F16G 13/06 474/208 |
| 2,431,702 A * | 12/1947 | McCann | .................. | F16G 13/06 474/231 |
| 2,841,022 A * | 7/1958 | Tucker | ................. | B62D 53/025 180/235 |
| 2,909,938 A * | 10/1959 | Sharp | ...................... | F16G 13/06 267/180 |
| 4,114,467 A * | 9/1978 | Petershack | ........... | B62D 55/202 198/851 |

(Continued)

FOREIGN PATENT DOCUMENTS

JP   9-287637 A   11/1997
JP   10-78089 A   3/1998

OTHER PUBLICATIONS

Office Action dated Feb. 2, 2019, issued in counterpart Chinese Application No. 201710541648.3, with English translation (9 pages).

*Primary Examiner* — Henry Y Liu
(74) *Attorney, Agent, or Firm* — Westerman, Hattori, Daniels & Adrian, LLP

(57) ABSTRACT

A roller chain with a simple structure is provided, which can mitigate impact load on rollers due to collision with sprockets and can lengthen roller life, as well as minimize interference between the sprockets and inner plates. A roller chain includes rollers that are formed in a cylindrical shape tubularly connected continuously in axial and circumferential directions of the rollers. Each of the rollers is curved such that an inner diameter at both ends thereof differs from that of a middle part, and that their outer diameter at both ends differs from that of the middle part, so that the rollers deform elastically when contacting sprockets S as the rollers are sandwiched between bushings and the sprockets.

3 Claims, 5 Drawing Sheets

(56) References Cited

U.S. PATENT DOCUMENTS

| | | | | |
|---|---|---|---|---|
| 4,129,045 | A * | 12/1978 | Kishitani | B62D 55/205 305/204 |
| 4,766,997 | A * | 8/1988 | Hannum | B65G 17/38 198/851 |
| 5,412,934 | A * | 5/1995 | Furuyama | F16G 13/06 474/206 |
| 5,425,679 | A * | 6/1995 | Utz | F16G 13/06 277/399 |
| 5,938,553 | A * | 8/1999 | Ishida | F16G 13/06 474/208 |
| 6,213,904 | B1 * | 4/2001 | Tanaka | B65G 17/38 474/209 |
| 7,972,233 | B2 * | 7/2011 | Fujiwara | F16C 33/76 474/209 |
| 2007/0270261 | A1 * | 11/2007 | Sakura | F16G 13/06 474/231 |
| 2009/0318254 | A1 * | 12/2009 | Suko | F16G 13/06 474/207 |

* cited by examiner

ROLLER CHAIN

BACKGROUND OF THE INVENTION

1. Field of the Invention

The present invention relates to a roller chain formed by a plurality of inner links and outer links coupled together in an endless manner.

2. Description of the Related Art

Roller chains formed by a plurality of inner links, a plurality of outer links, and rollers are conventionally known. The inner links are each configured by coupling a pair of front and rear bushings to a pair of left and right inner plates. The outer links are each configured by coupling a pair of front and rear connecting pins to a pair of left and right outer plates. The rollers are fitted on the bushings. The inner links and outer links are alternately and pivotably coupled together in a longitudinal direction of the chain by inserting the connecting pins in the bushings.

In such a roller chain, it is known that, when the chain runs, the rollers generate noise as they collide sprockets. It has been proposed, therefore, to fit rollers 180 formed by coiled spring wires in the shape of a coil spring on the bushings 140 as shown in FIGS. 9A and 9B for the purpose of reducing this noise (see, for example, Japanese Patent Application Laid-open No. H9-287637 and U.S. Pat. No. 2,909,938).

When colliding with sprockets S, each of the ring-like parts 180a that form the rollers 180 elastically deform in a radial direction, so as to mitigate the impact load due to the collision with the sprockets S, and thereby reduce the noise generated when they mate with the sprockets S.

SUMMARY OF THE INVENTION

However, each of the ring-like parts 180a that form the coil spring-like rollers 180 does not necessarily deform elastically in a uniform manner when the rollers 180 collide with the sprockets S. Elastic deformation occurs disproportionately and localizes in the large-diameter ring-like parts 180a that make contact with the sprockets S more frequently as shown in FIGS. 9A and 9B. Thus the large-diameter ring-like parts 180a are more susceptible to plastic deformation and damage, as a result of which life of the rollers 180 could be shortened.

When the large-diameter ring-like parts 180a undergo plastic deformation into an oval shape or the like, the rollers 180 can no longer rotate smoothly relative to the bushings 140. As this deteriorates the original function of the rollers, which is to reduce resistance between bushings and sprockets S, the rollers 180 will be even more susceptible to local damage or the like.

In modern car engine applications, demands are growing for more lightweight designs for timing chains and the like used in the engine for the purpose of, for example, improving fuel economy of the engine. The rollers 180, too, are therefore desired to be lighter. To meet with the demands, for example the coil spring-like rollers 180 need to be formed from thinner spring wires, which only results in lowered strength of the ring-like parts 180a and exacerbates the problems described above.

An object of the present invention is to solve these problems and to provide a roller chain with a simple structure that can mitigate impact load on rollers due to collision with sprockets and can lengthen roller life, as well as minimize interference between the sprockets and inner plates.

The present invention solve the problems above by providing a roller chain including a plurality of inner links each configured by coupling a pair of front and rear bushings to a pair of left and right inner plates, a plurality of outer links each configured by coupling a pair of front and rear connecting pins to a pair of left and right outer plates, and rollers fitted on the brushings, the inner links and the outer links being alternately and pivotably coupled together in a longitudinal direction of the chain by inserting the connecting pins in the bushings, the rollers being formed in a cylindrical shape tabularly connected continuously in axial and circumferential directions of the rollers, and each of the rollers being curved such that an inner diameter at both ends thereof differs from that of a middle part thereof, and an outer diameter at both ends thereof differs from that of the middle part, so that the rollers deform elastically when contacting sprockets as the rollers are sandwiched between the bushings and the sprockets.

According to one aspect of the present invention, the rollers are curved so that they deform elastically when contacting sprockets as they are sandwiched between the sprockets and the bushings. This way, the rollers provide springiness by undergoing elastic deformation to mitigate impact load due to collision with sprockets, and can thus reduce noise generated when they mate with the sprockets.

The rollers are formed in a cylindrical shape tabularly connected continuously in axial and circumferential directions of the rollers, so that they can absorb the impact from the sprockets by the elastic deformation in their entirety, unlike conventional rollers in the form of a coil spring, where the impact from the sprockets localizes in large-diameter ring-like parts. This way, local plastic deformation and damage of roller are minimized and roller life can be lengthened.

According to another aspect of the present invention, the rollers are curved such that the inner diameter at both ends of the rollers is larger than that of the middle part, and the outer diameter at both ends thereof is larger than that of the middle part. This way, lubricating oil can readily enter between the rollers and the bushings from both ends of the rollers, so that the lubricating oil itself between the rollers and the bushings can provide a function of mitigating and damping impacts, and thus the impact load due to collision with so can be further reduced.

Also, the rollers are formed in a cylindrical shape tubularly connected continuously in the axial and circumferential directions of the rollers, and curved such that the outer diameter at both ends thereof is larger then that of the middle part of the rollers. This way, when contacting the sprockets, the rollers can smoothly guide the sprockets axially inward by the outer circumferential surface thereof that is facially continuous in the axial direction, and thereby minimize interference between the sprockets and the inner plates, which prevents generation of noise.

According to another aspect of the present invention, the rollers are curved such that the inner diameter at both ends thereof is smaller than that of the middle part, and the outer diameter at both ends thereof is smaller than that of the middle part. This way, lubricating oil can be readily kept between the rollers and the bushings, so that the lubricating oil itself between the rollers and the bushings can provide a function of mitigating and damping impacts, and thus the impact load due to collision with sprockets can be further reduced.

DESCRIPTION OF THE PREFERRED EMBODIMENTS

Hereinafter, a roller chain 10 according to a first embodiment of the present invention will be described with reference to FIGS. 1 to 4.

Figure 1:
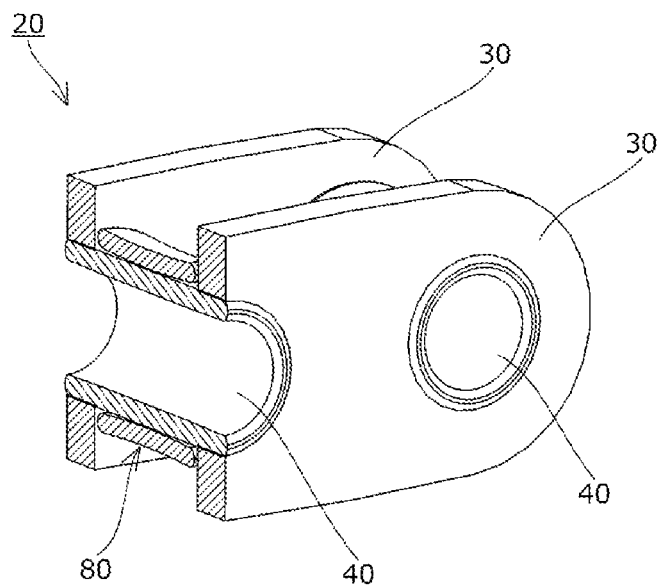
FIG. 1 is a cross-sectional perspective view illustrating an inner link of a roller chain according to a first embodiment.
Figure 2:
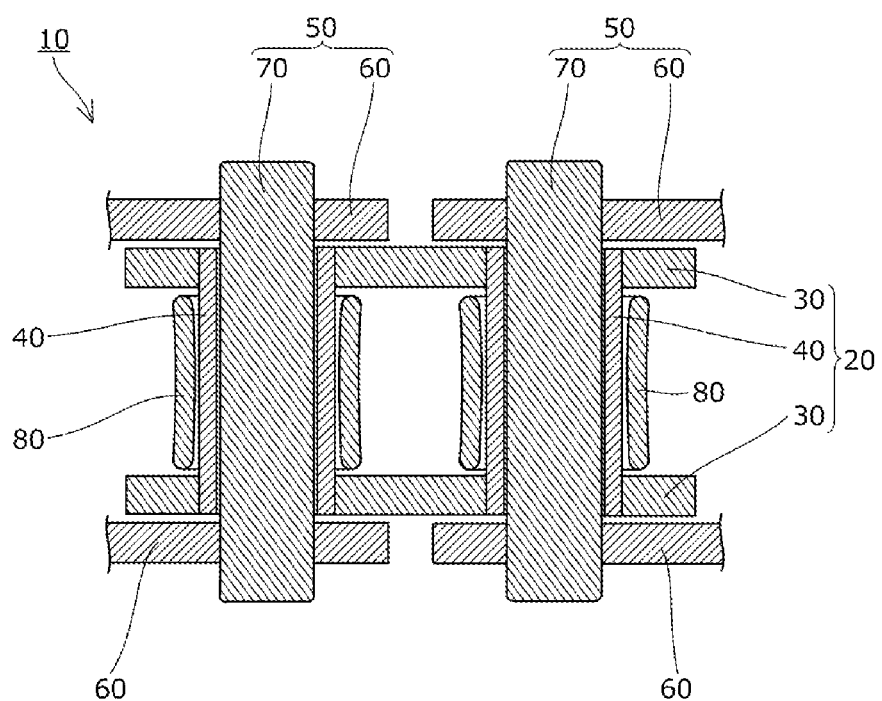
FIG. 2 is a cross-sectional view illustrating the roller chain according to the first embodiment.

The roller chain 10 of the first embodiment is configured as a timing chain used in a car engine and includes, as shown in FIGS. 1 and 2, a plurality of inner links 20 each made up of a pair of front and rear cylindrical bushings 40 connected to a pair of left and right inner plates 30, a plurality of outer links 50 each made up of pair of front and rear connecting pins 70 connected to a pair of left and right outer plates 60, and metal rollers 80 fitted on the bushings 40. These plurality of inner links 20 and outer links 50 are alternately and pivotably connected to each other along the longitudinal direction of the chain by inserting the connecting pins 70 in the bushings 40.

Figure 3:
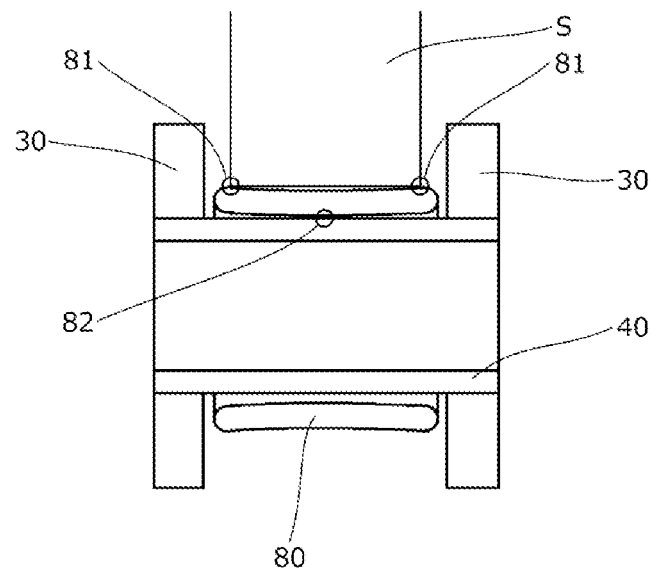
FIG. 3 is an illustrative diagram showing how a sprocket and a roller make contact with each other in the first embodiment.

Each roller 80 is formed in a cylindrical shape tubularly connected continuously in axial and circumferential directions of the roller as shown in FIGS. 1 to 3.

Each roller 80 is curved to flare out at both ends, so that the inner diameter at both ends of the roller is larger than the inner diameter of a middle part of the roller, as well as the outer diameter at both ends of the roller is larger than the outer diameter of the middle part of the roller.

The outer circumferential surface of the roller 80 is concavely curved such that the roller diameter reduces smoothly from both axial ends of the roller toward the center of the roller.

The inner circumferential surface of the roller 80 is convexly curved such that the roller diameter reduces smoothly from both axial ends of the roller toward the center of the roller.

The thickness of the roller 80 is substantially uniform over the entire surface.

Figure 4:
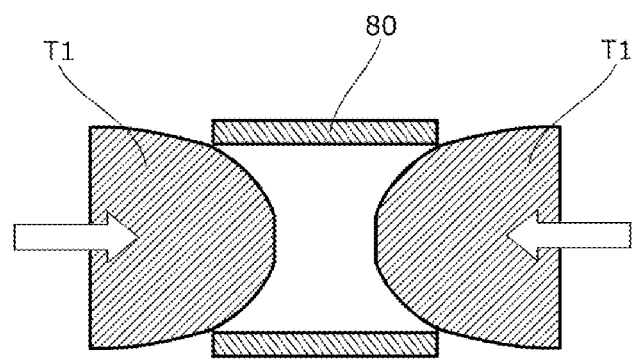
FIG. 4 is an illustrative diagram showing an example of a forming method of the roller of the first embodiment.

In this embodiment, the roller 80 is formed as shown in FIG. 4, wherein, after forming a sheet material into a cylindrical shape, jigs T1 are inserted from both ends of the roller to fit into the inner circumference of the roller 80.

Specific methods of forming the roller 80 are not limited to the one described above and may include any means or processes.

In the roller chain 10 of the first embodiment thus obtained, when the roller contacts the sprocket S, the outer circumferential surface of the roller 80 makes contact with the sprocket S at two sprocket contact portions 81 near both ends of the roller, while the inner circumferential surface of the roller 80 makes contact with the bushing 40 at one bushing contact portion 82 near the center of the roller, as shown in FIG. 3.

The roller thus makes contact with the sprocket S and bushing 40 at two sprocket contact portions 81 and one bushing contact portion 82, respectively, which are axially offset, and is sandwiched between the bushing 40 and the sprocket S, so that, when contacting the sprocket S, the roller 80 undergoes elastic deformation substantially entirely, so as to mitigate the impact load due to collision with the sprocket S.

Specific shapes of the roller 80 are not limited to the one described above and may include any features as long as the roller 80 is curved such that its inner diameter is larger at both ends than in the middle and its outer diameter is larger at both ends than in the middle so that the roller deforms elastically when making contact with the sprocket S as it is sandwiched between the bushing 40 and the sprocket S.

For example, while the roller 80 described above is curved entirely along its axial direction, the roller may be curved only at both ends to increase in diameter outward in the axial direction, and not curved in the middle. In this case, the middle part of the roller is kept cylindrical, so that the inner circumferential surface of the roller 80 makes contact with the outer circumferential surface of the bushing 40 over a predetermined distance along the axial direction of the roller in the middle of the roller (bushing contact portion 82), which will minimize tilting of the roller 80 relative to the bushing 40.

Next, a roller chain 10 according to a second embodiment of the present invention will be described with reference to FIGS. 5 to 8. The second embodiment is exactly the same as the previously described first embodiment other than the roller 80, and therefore the configurations other than the roller 80 will not be described again.

Figure 5:
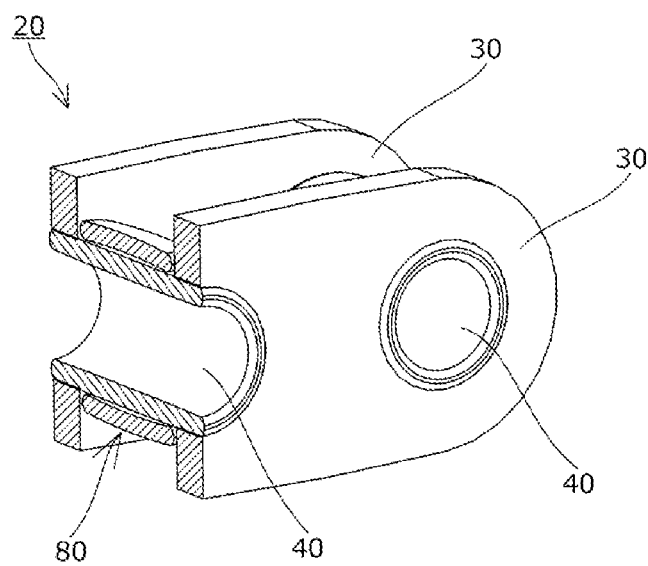
FIG. 5 is a cross-sectional perspective view illustrating an inner link of a roller chain according to a second embodiment.
Figure 6:
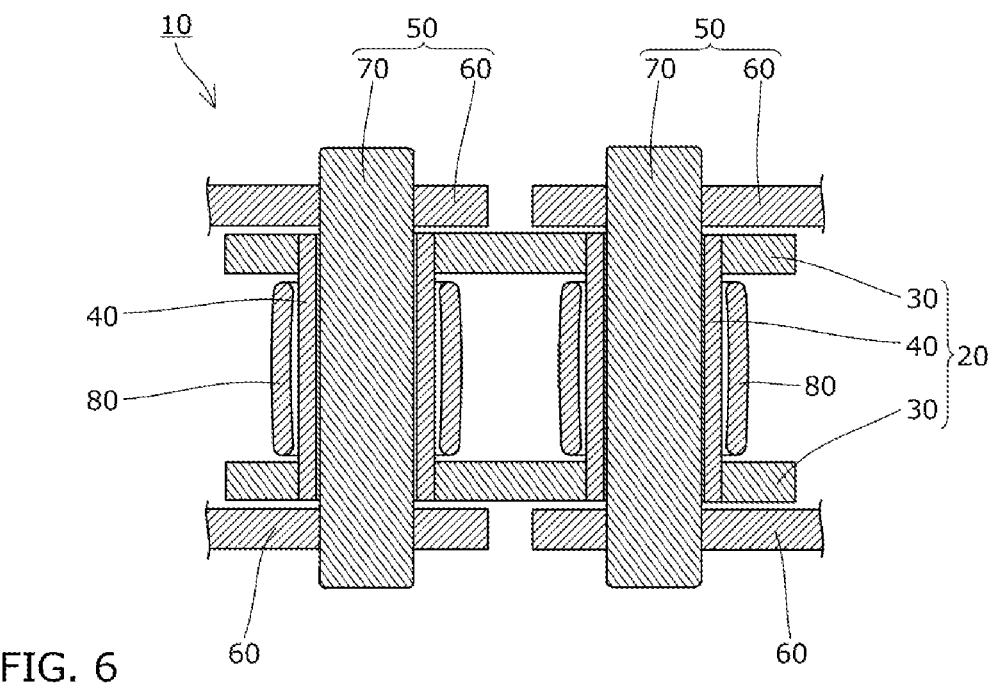
FIG. 6 is a cross-sectional view illustrating the roller chain according to the second embodiment.
Figure 7:
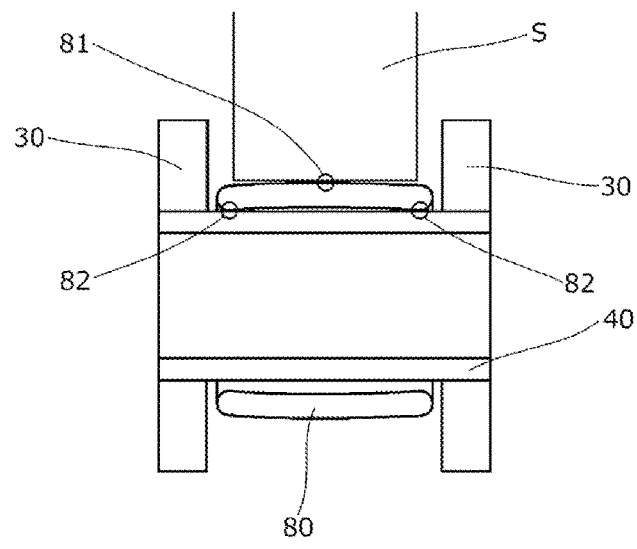
FIG. 7 is an illustrative diagram showing how a sprocket and a roller make contact with each other in the second embodiment.

The roller 80 in the roller chain 10 of the second embodiment is formed in a cylindrical shape tubularly connected continuously in the axial and circumferential directions of the roller as shown in FIGS. 5 to 7.

Each roller 80 is curved in a barrel-like shape such as to bulge in the middle, so that the inner diameter at both ends of the roller is smaller than the inner diameter in the middle part of the roller, as well as the outer diameter at both ends of the roller is smaller than the outer diameter in the middle part of the roller.

The outer circumferential surface of the roller 80 is convexly curved such what the roller diameter increases smoothly from both axial ends of the roller toward the center of the roller.

The inner circumferential surface of the roller 80 is concavely curved such that the roller diameter increases smoothly from both axial ends of the roller toward the center of the roller.

The thickness of the roller 80 is substantially uniform over the entire surface.

Figure 8:
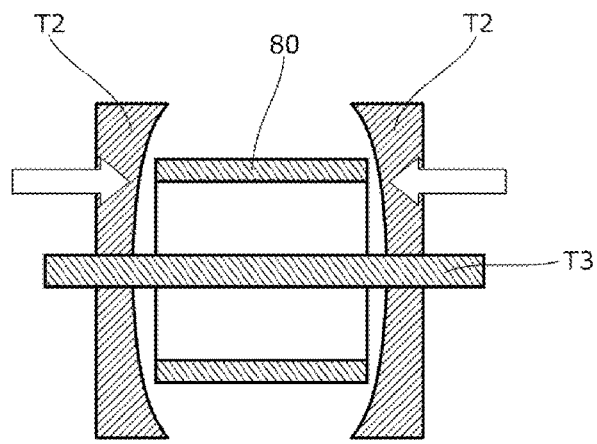
FIG. 8 is an illustrative diagram showing an example of a forming method of the roller of the second embodiment.
Figure 9A:
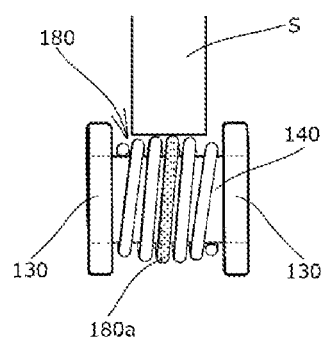
FIGS. 9A and 9B are illustrative diagrams showing how a sprocket and a roller make contact with each other in a conventional roller chain.
Figure 9B:
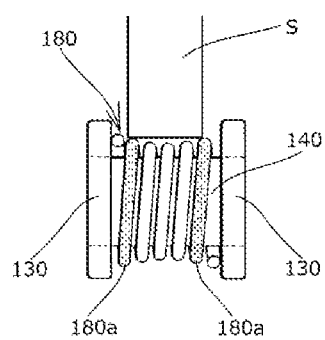

In this embodiment, the roller 80 is formed as shown in FIG. 8, wherein, after forming a sheet material into a cylindrical shape, two jigs T2 on both ends of the roller opposite each other are brought closer to apply forces to the roller such as to reduce the diameter at both ends of the roller 80.

T3 in FIG. 8 represents another jig for positioning the two jigs T2.

Specific methods of forming the roller 80 are not limited to the one described above and may include any means or processes.

In the roller chain 10 of the second embodiment thus obtained, when the roller contacts the sprocket S, the outer circumferential surface of the roller 80 makes contact with the sprocket S at one sprocket contact portion 81 in the middle of the roller, while the inner circumferential surface of the roller 80 makes contact with the bushing 40 at two bushing contact portions 82 near both ends of the roller, as shown in FIG. 7.

The roller thus makes contact with the sprocket S and bushing 40 at one sprocket contact portion 81 and two bushing contact portions 82, respectively, which are axially offset, and is sandwiched between the bushing 40 and the sprocket S, so that, when contacting the sprocket S, the roller 80 undergoes elastic deformation substantially entirely, so as to mitigate the impact load due to collision with the sprocket S.

Specific shapes of the roller 80 are not limited to the one described above and may include any features as long as the roller 80 is curved such that its inner diameter is smaller at both ends than in the middle and its outer diameter is smaller at both ends than in the middle, so that the roller deforms elastically when making contact with the sprocket S as it is sandwiched between the bushing 40 and the sprocket S.

For example, while the roller 80 described above is curved entirely along its axial direction, the roller may be curved only at both ends to reduce in diameter outward in the axial direction, and not curved in the middle. In this case, the middle part of the roller is kept cylindrical, so that the outer circumferential surface of the roller 80 makes contact with the sprocket S over a predetermined distance along the axial direction of the roller in the middle of the roller (sprocket contact portion 81), which will minimize tilting of the roller 80 relative to the sprocket S.

While embodiments of the present invention have been described in detail, the present invention is not limited to the above-described embodiments and may be carried out with various design changes without departing from the scope of the present invention set forth in the claims.

For example, while the roller chain was described as a timing chain of a car engine in the embodiments above, the purpose of use of the roller chain of the present invention is not limited to this application, and may be used as a transmission chain or a conveyor chain.

While the chains in the embodiments above have one inner link in the chain width direction, they may have a plurality of inner links arranged in the chain width direction.

While the bushings are cylindrical in the embodiments described above, specific shapes of the bushings are not limited to the one described. The bushing may have any other shapes, e.g., curved such as to bulge in the middle in the axial direction thereof, in a barrel-like shape.

The rollers may be formed by rolling a sheet material into a tube, or may be formed seamlessly.

What is claimed is:

1. A roller chain comprising: a plurality of inner links each configured by coupling a pair of front and rear bushings to a pair of left and right inner plates; a plurality of outer links each configured by coupling a pair of front and rear connecting pins to a pair of left and right outer plates; and rollers fitted on said bushings, said inner links and said outer links being alternately and pivotably coupled together in a longitudinal direction of the chain by inserting said connecting pins in said bushings, said rollers being formed in a cylindrical shape tabularly connected continuously in axial and circumferential directions of the rollers, and each of said rollers being curved such that an inner diameter at both ends thereof differs from that of a middle part thereof, and an outer diameter at both ends thereof differs from that of the middle part, so that the rollers deform elastically when contacting sprockets as the rollers are sandwiched between said the sprockets.

2. The roller chain according to claim 1, wherein each of said rollers is curved such that the inner diameter at said both ends thereof is larger than that of said middle part, and the outer diameter at said both ends thereof is larger than that of said middle part.

3. The roller chain according to claim 1, wherein each of said rollers is curved such that the inner diameter at said both ends thereof is smaller than that of said middle part, and the outer diameter at said both ends thereof is smaller than that of said middle part.

* * * * *